(12) United States Patent
Kim et al.

(10) Patent No.: US 12,474,605 B2
(45) Date of Patent: Nov. 18, 2025

(54) POLYMER DISPERSED LIQUID CRYSTAL AND POLYMER DISPERSED LIQUID CRYSTAL DISPLAY INCLUDING THE SAME

(71) Applicant: Electronics and Telecommunications Research Institute, Daejeon (KR)

(72) Inventors: Gi Heon Kim, Daejeon (KR); Won Jae Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/802,784

(22) Filed: Aug. 13, 2024

(65) Prior Publication Data
US 2025/0164834 A1 May 22, 2025

(30) Foreign Application Priority Data
Nov. 16, 2023 (KR) .................. 10-2023-0158909

(51) Int. Cl.
*G02F 1/1334* (2006.01)
*C09K 19/52* (2006.01)
*C09K 19/54* (2006.01)
*G02F 1/1343* (2006.01)

(52) U.S. Cl.
CPC .......... *G02F 1/1334* (2013.01); *C09K 19/544* (2013.01); *G02F 1/134309* (2013.01); *C09K 2019/521* (2013.01)

(58) Field of Classification Search
CPC ............. G02F 1/1334; G02F 1/134309; C09K 19/544; C09K 2019/521
See application file for complete search history.

(56) References Cited

U.S. PATENT DOCUMENTS

| | | |
|---|---|---|
| 2018/0136507 A1 | 5/2018 | Kim et al. |
| 2022/0250450 A1 | 8/2022 | Hwang |
| 2023/0280620 A1 | 9/2023 | Kim et al. |
| 2023/0341721 A1 | 10/2023 | Takemoto et al. |

FOREIGN PATENT DOCUMENTS

| | | | | |
|---|---|---|---|---|
| CN | 111929940 A | * | 11/2020 | ........... G02F 1/1333 |
| JP | 2013-28082 A | | 2/2013 | |
| KR | 10-2015-0086929 A | | 7/2015 | |

(Continued)

OTHER PUBLICATIONS

Machine translation of CN-111929940-A (Year: 2018).*

(Continued)

*Primary Examiner* — James R Greece
*Assistant Examiner* — Jose M Diaz
(74) *Attorney, Agent, or Firm* — NSIP Law

(57) ABSTRACT

Provided is a polymer dispersed liquid crystal display including a first substrate and a second substrate disposed to oppose each other, a first electrode on an upper surface of the first substrate, a second electrode on a lower surface of the second substrate, wherein the upper surface of the first substrate faces the lower surface of the second substrate, a liquid crystal layer disposed between the first electrode and the second electrode, quid crystal drops distributed in the liquid crystal layer, and nano-particles distributed in the liquid crystal layer, wherein the nano-particles are insulators and may have light transmittance.

18 Claims, 3 Drawing Sheets

(56) References Cited

FOREIGN PATENT DOCUMENTS

| | | |
|---|---|---|
| KR | 10-2018-0056001 A | 5/2018 |
| KR | 10-2020-0061032 A | 6/2020 |
| KR | 10-2022-0112234 A | 8/2022 |
| KR | 10-2022-0125387 A | 9/2022 |
| KR | 10-2022-0161317 A | 12/2022 |
| KR | 10-2561949 B1 | 8/2023 |

OTHER PUBLICATIONS

Korean Office Action Issued on Jun. 27, 2025, in Counterpart Korean Patent Application No. 10-2023-0158909 (7 Pages in English, 7 Pages in Korean).

* cited by examiner

POLYMER DISPERSED LIQUID CRYSTAL AND POLYMER DISPERSED LIQUID CRYSTAL DISPLAY INCLUDING THE SAME

CROSS-REFERENCE TO RELATED APPLICATIONS

This U.S. non-provisional patent application claims priority under 35 U.S.C. § 119 of Korean Patent Application No. 10-2023-0158909, filed on Nov. 16, 2023, the entire contents of which are hereby incorporated by reference.

BACKGROUND

The present disclosure herein relates to a polymer dispersed liquid crystal and a polymer dispersed liquid crystal display including the same.

In general, a liquid crystal display is a device that uses optical anisotropy and birefringent properties of liquid crystal molecules to display images, and a thin-film transistor liquid crystal display (TFT LCD) that uses a thin-film transistor (TFT) as a switching element is mainly used. However, a common liquid crystal display should use a polarizing plate, and in reality, about 70% to 80% of light incident from a back light unit is lost before being displayed to the outside, so that the light efficiency is low, and also, there is a problem such as light scattering or phase distortion due to an orientation process.

In order to solve the above-described problem, a polymer dispersed liquid crystal (PDLC) display has been proposed. Here, a PDLC is one of liquid crystal cells used in a liquid crystal display (LCD), and controls the transmission of light in accordance with the intensity of light scattering, and is characterized by not requiring a polarizing plate. Several types of structures have been proposed, such as those in which a large number of liquid crystal molecular particles of several millimeters in size are dispersed in a polymer material, and those in which liquid crystals are included in a mesh-shaped polymer. That is, the PDLC display is an element configured to non-uniformly disperse a liquid crystal material and a material other than the liquid crystal, and is operated using a difference in refractive index between the two materials.

If a voltage is not applied to the PDLC display, directions of liquid crystal molecules become irregular, and causes scattering at the interface having a different refractive index from a medium. In addition, if a voltage is applied thereto, directions of liquid crystals become aligned, and refractive indices of the two materials coincide, thereby being in a transmissive state. The above-described PDLC display does not require an alignment film and a polarizing plate, and is flexible, so that it is easy to manufacture the same, and in addition, the PDLC display has excellent luminance properties, and thus, may be used in large displays, projection TVs, and the like.

SUMMARY

In a transparent state, a polymer dispersed liquid crystal display displays the arrangement of liquid crystal molecules differently depending on the position, gaze direction, and the like of a user. Therefore, there is a difference in refractive index between a polymer and a liquid crystal, and there is a difference in transparency of the display depending on the position of the user. As a polymer dispersed liquid crystal display becomes larger, the above-described phenomenon intensifies. In addition, there is a problem in that the phenomenon intensifies as the user is closer to the polymer dispersed liquid crystal display.

An embodiment of the inventive concept provides a polymer dispersed liquid crystal display including a first substrate and a second substrate disposed to oppose each other, a first electrode on an upper surface of the first substrate, a second electrode on a lower surface of the second substrate, wherein the upper surface of the first substrate faces the lower surface of the second substrate, a liquid crystal layer disposed between the first electrode and the second electrode, quid crystal drops distributed in the liquid crystal layer, and nano-particles distributed in the liquid crystal layer, wherein the nano-particles are insulators and have light transmittance.

In an embodiment of the inventive concept, a polymer dispersed liquid crystal display includes a first substrate and a second substrate disposed to oppose each other, a first electrode on an upper surface of the first substrate, a second electrode on a lower surface of the second substrate, wherein the upper surface of the first substrate faces the lower surface of the second substrate, a liquid crystal layer disposed between the first electrode and the second electrode, liquid crystal drops distributed in the liquid crystal layer, and nano-particles aligned along the upper surface of the first electrode, wherein the nano-particles are insulators and have light transmittance.

In an embodiment of the inventive concept, a polymer dispersed liquid crystal display includes a first substrate and a second substrate disposed to oppose each other, a first electrode on an upper surface of the first substrate, a second electrode on a lower surface of the second substrate, wherein the upper surface of the first substrate faces the lower surface of the second substrate, a liquid crystal layer disposed between the first electrode and the second electrode, liquid crystal drops distributed in the liquid crystal layer, and nano-particles distributed in the first substrate, wherein the nano-particles are aligned along the upper surface of the first substrate, and the nano-particles are insulators and have light transmittance.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the inventive concept will be described with reference to the accompanying drawings to describe the inventive concept in detail.

Figure 1:
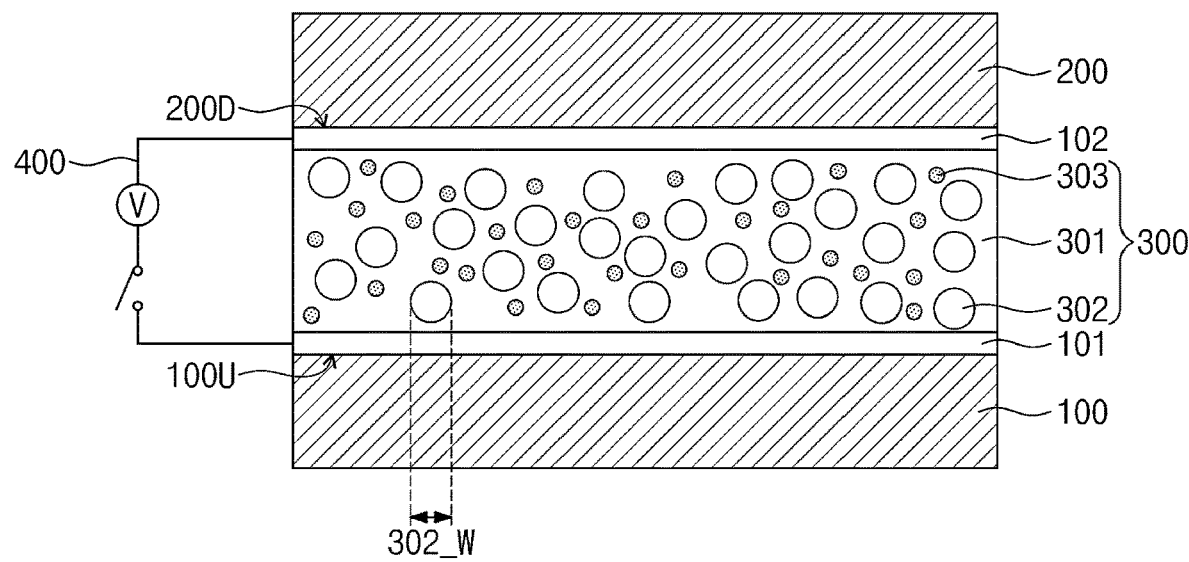
FIG. 1 is a view showing a polymer dispersed liquid crystal display according to some embodiments of the inventive concept.
Figure 2:
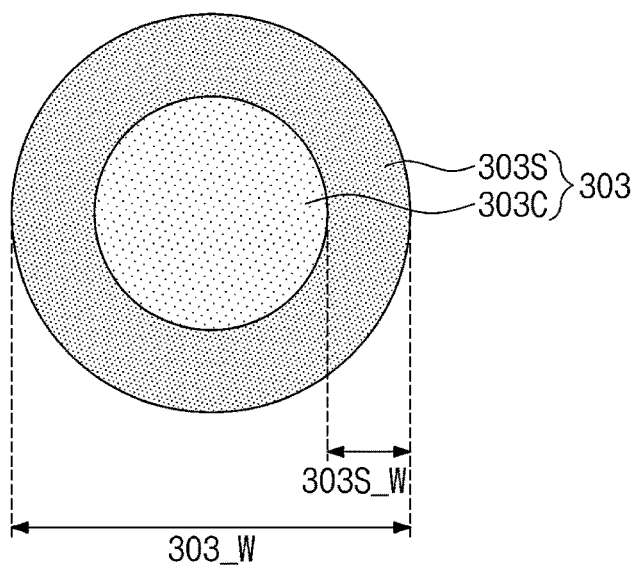
FIG. 2 is a schematic view for describing a nano-particle of a core-shell structure.

FIG. 1 is a view showing a polymer dispersed liquid crystal display according to some embodiments of the inventive concept. FIG. 2 is a schematic view for describing a nano-particle of a core-shell structure.

Referring to FIG. 1, a first substrate 100 and a second substrate 200 may be disposed to oppose each other. An upper surface 100U of the first substrate 100 and a lower surface 200D of the second substrate 200 may face each other. The first substrate 100 and the second substrate 200 may be glass substrates or plastic substrates. The first substrate 100 and the second substrate 200 may have various shapes such as a flat surface, a curved surface, and a bent surface.

A first electrode 101 and a second electrode 102 may be disposed between the first substrate 100 and the second substrate 200. The first electrode 101 may be disposed on the upper surface 100U of the first substrate 100, and the second electrode 102 may be disposed on the lower surface 200D" of the second substrate 200. Both the first electrode 101 and the second electrode 102 may include a transparent conductive material. For example, the first electrode 101 and the second electrode 102 may include at least one of indium tin oxide (ITO), indium zinc oxide (IZO), silver nanowire, aluminum, carbon nanotube (CNT), graphene, PEDOT:PSS, polyaniline, or polythiophene. The first electrode 101 and the second electrode 102 may be connected to a power supply unit 400 configured to apply a voltage, and through the power supply unit 400, it is possible to control a transparent state and an opaque state of a polymer dispersed liquid crystal display.

A liquid crystal layer 300 may be disposed between the first electrode 101 and the second electrode 102. The liquid crystal layer 300 may include a polymer 301, liquid crystal drops 302, and nano-particles 303.

The liquid crystal drops 302 may be distributed in the liquid crystal layer 300. According to some embodiments of the inventive concept, the liquid crystal drops 302 may be normal liquid crystals. In the case of the normal liquid crystals, if an electric field is applied to the liquid crystal drops 302 through the power supply unit 400, the arrangement of liquid crystal molecules in the liquid crystal drops 302 may change into the direction of the electric field. In this case, the liquid crystal drops 302 may have a flow viscosity of 50 mm$^2$/s to 150 mm$^2$/s, a refractive index anisotropy of 0.05 to 0.30, and a dielectric anisotropy (102 kHz) of 2.0 to 40.0. If the liquid crystal drops 302 are normal liquid crystals, a transparent polymer dispersed liquid crystal display may be provided when an electric field is applied through the power supply unit 400, and an opaque polymer dispersed liquid crystal display may be provided when an electric field is not applied.

According to other embodiments of the inventive concept, the liquid crystal drops 302 may be reverse liquid crystals. In the case of the reverse liquid crystals, if an electric field is applied to the liquid crystal drops 302 through the power supply unit 400, the arrangement of molecules in the liquid crystal drops 302 may change into the vertical direction of the electric field. At this time, the liquid crystal drops 302 may have a flow viscosity of 50 mm$^2$/s to 180 mm$^2$/s, a refractive index anisotropy of 0.05 to 0.30, and a dielectric anisotropy (102 kHz) of (−)2.5 to (−)25.0. In this case, an opaque polymer dispersed liquid crystal display may be provided when an electric field is applied through the power supply unit 400, and a transparent polymer dispersed liquid crystal display may be provided when an electric field is not applied.

The polymer 301 may cover the liquid crystal drops 302 and the nano-particles 303. The weight ratio of the polymer 301 to the liquid crystal drops 302 may be 1:2 to 3:2.

According to some embodiments of the inventive concept, in the case of normal liquid crystals in which if an electric field is applied, the liquid crystal molecular arrangement of the liquid crystal drops 302 changes into the direction of the electric field, the refractive index of the polymer 301 may be 1.35 to 1.55.

According to other embodiments of the inventive concept, in the case of reverse liquid crystals in which if an electric field is applied, the liquid crystal molecular arrangement of the liquid crystal drops 302 changes into the vertical direction of the electric field, the refractive index of the polymer 301 may be 1.40 to 1.65.

The polymer 301 may be formed by a photo-curing reaction of a polymer precursor and an ultraviolet initiator. The ultraviolet initiator may have a weight ratio of 0.5 to 10 with respect to 100 of the weight of the polymer precursor. The polymer 301 may be formed by irradiating the ultraviolet initiator and the polymer precursor with light of 250 nm to 400 nm wavelength having a photo-curing energy of 100 mJ to 10000 mJ.

The ultraviolet initiator may include any one selected from 1-hydroxy-cyclohexyl-pentyl-ketone (Irgacure 907), 2-methyl-1[4-(methylthio)phenyl]-2-morpholinopropane-1-one (Irgacure 184C), 1-hydroxy-2-methyl-1-phenyl-propane-1-one (Darocur 1173), an initiator (Irgacure 304) in which 50 wt % of Irgacure 184C and 50 wt % of benzophenone are mixed, an initiator (Irgacure 1000) in which 20 wt % of Irgacure 184 and 80 wt % of Irgacure 1173 are mixed, 2-hydroxy-1-[4-(2-hydroxyethoxy)phenyl]-2-methyl-1 propanone (Irgacure 2959), methylbenzoylformate (Darocur MBF), alpha, alpha-dimethoxy-alpha-phenylacetophenone (Irgacure 651), 2-benzyl-2-(dimethylamino)-1-[4-(morpholinyl)phenyl]-1-butanone (Irgacure 369), an initiator (Irgacure 1300) in which 30 wt % of Irgacure 369 and 70 wt % of Irgacure 651 are mixed, diphenyl (2,4,6-trimethylbenzoyl)-phosphine oxide (Darocur TPO), an initiator (Darocur 4265) in which 50 wt % of Darocur TPO and 50 wt % of Darocur 1173 are mixed, phosphine oxide, phenyl bis(2,4,6-trimethyl benzoyl (Irgacure 819), 2-hydroxy-2-methyl-1-phenyl-propane-1-one (Darocur 1173), an initiator (Irgacure 2005) in which 5 wt % of Irgacure 819 and 95 wt % of Darocur 1173 are mixed, an initiator (Irgacure 2010) in which 10 wt % of Irgacure 819 and 90 wt % of Darocur 1173 are mixed, an initiator (Irgacure 2020) in which 20 wt % of Irgacure 819 and 80 wt % of Darocur 1173 are mixed, bis(.eta.5-2,4-cyclopentadien-1-yl) bis [2,6-difluoro-3-(1H-pyrrol-1-yl)phenyl]titanium (Irgacure 784), an initiator (HSP 188) containing benzophenone, 1-hydroxy-cyclohexylphenyl-ketone (CPA), 2,4,6,-trimethylbenzoyl-diphenyl-phosphineoxide (Darocur TPO) and a mixture thereof.

The polymer precursor may be an ultraviolet curable polymer. The ultraviolet curable polymer is a polymer cured by ultraviolet light, and may include an amorphous or semicrystalline monomer or oligomer cured by ultraviolet light. The ultraviolet curable polymer may include any one among urethane acrylate oligomer (molecular weight, 1000 to 4000), 2(2-ethoxyethoxy) ethyl acrylate (EOEOEA), isobornyl acrylate (IOBA), triethylopropane triacrylate (TMPTA), tri(propylene glycol) diacrylate (TPGDA), penthaerithritol triacrylate (PETA), hydroxyethyl acrylate (HEA), trimethylolpropane ethoxylate triacrylate (TMPEOTA), 2-phenoxyethyl acrylate (2-PEA), methyl methacrylate (MMA), methacrylate (MA), tetrahydrofurfuryl acrylate, tri(propylene glycol) glycerolate diacrylate (TPGDA), vinylacrylate (VA), ethylene glycol dimethacrylate (EGDA), epoxy acrylate monomer or oligomer, 1,6-hexandiol diacrylate (HAD), 2-hydroxyethyl methacrylate (2-HEMA), 2-ethylheyxyl acrylate, ethylene glycol diacrylate, trimethylolpropane dially ether, urethane diacrylate, 2-phenoxyethyl acrylate, and tetrahydrofurfuryl acrylate.

Referring to FIG. 1 and FIG. 2, the nano-particles 303 may be distributed in the liquid crystal layer 300. The nano-particles 303 may be insulators and may have light transmittance, and the nano-particles 303 may include, for example, silicon oxide. The nano-particles 303 may have a refractive index similar to that of the liquid crystal drops 302 and the polymer 301, and the refractive index of the nano-particles 303 may be, for example, 1.35 to 1.65. A diameter 303_W of each of the nano-particles 303 may be smaller than a diameter 302_W of each of the liquid crystal drops 302. The diameter 303_W of each of the nano-particles 303 may be smaller than a wavelength of visible light, and may be, for example, 30 nm to 350 nm.

Each of the nano-particles 303 may include a core portion 303C and a shell portion 303S surrounding the core portion 303C. The core portion 303C may be composed of silicon oxide. The shell portion 303S may be an insulator and may have light transmittance. A thickness 303S_W of the shell portion 303S may be 5 nm to 100 nm, and the volume ratio of the core portion 303C to the shell portion 303S may be 91:9 to 30:70.

According to some embodiments of the inventive concept, the formation of the shell portion 303S may be performed by, for example, a photo-curing reaction of a shell portion precursor. The shell portion precursor may include a monomer having a double bond. The monomer having a double bond may include any one or more of acrylate, siloxane, and silane, and the shell portion 303S formed through the photo-curing reaction may include any one or more selected from —COOH, —SiO—, and —Si. The photo-curing reaction may be a photo-curing reaction for forming the polymer 301. The shell portion 303S may be formed together with the formation of the polymer 301, and may be cross-linked with the polymer 301.

According to another embodiment of the inventive concept, the shell portion 303S may be, for example, a bulk material having no reactivity. The formation of the nano-particles 303 may be performed by, for example, a sintering process of a bulk material which forms the core portion 303C and the shell portion 303S. In this case, the liquid crystal layer 300 may further include a dispersant. The dispersant may have a weight ratio of 1 to 2 with respect to 100 of the weight of the nano-particles 303. Because of the dispersant, the nano-particles 303 may not sink, and may be distributed in the liquid crystal layer 300.

The nano-particles 303 have excellent transparency, and have a refractive index similar to that of the liquid crystal drops 302 and the polymer 301. Therefore, incident light may be diffused in many directions by the nano-particles 303. As a result, in a transparent state, the polymer dispersed liquid crystal display may provide the same transparency regardless of the position and gaze direction of a user.

Figure 3:
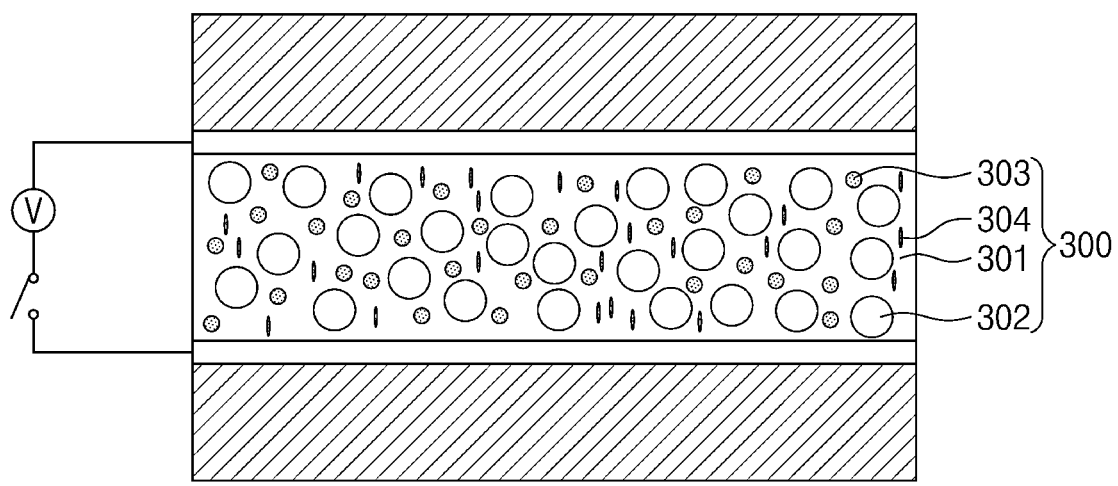
FIG. 3 is a view showing a polymer dispersed liquid crystal display according to some embodiments of the inventive concept, and is a view showing a polymer dispersed liquid crystal display in which dyes are distributed.

FIG. 3 is a view showing a polymer dispersed liquid crystal display according to some embodiments of the inventive concept, and is a view showing a polymer dispersed liquid crystal display in which dyes are distributed. In order to simply the description, the same descriptions as those of the polymer dispersed display described with reference to FIG. 1 to FIG. 2 will be omitted.

Referring to FIG. 3, the liquid crystal layer 300 may further include dyes 304. The dyes 304 may be distributed in the liquid crystal layer 300, and the polymer 301 may cover the dyes 304. Each of the dyes 304 may be any one selected from a red dye, a blue dye, a green dye, and a dye formed of a mixture thereof, and a polymer dispersed liquid crystal display having various colors may be provided because of the dyes.

The blue dye may have a structure represented by Formula 1 and/or Formula 2 below.

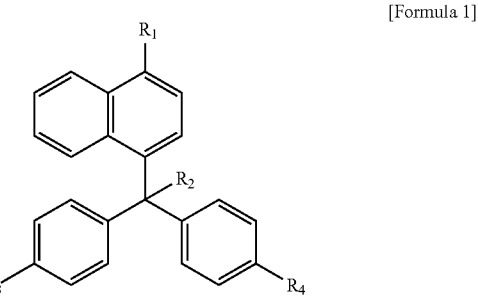

[Formula 1]

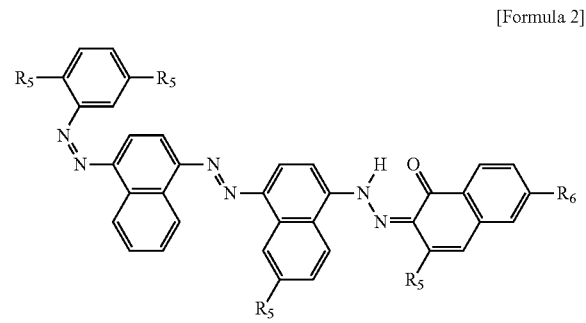

[Formula 2]

In Formula 1 above, R1, R2, R3, and R4 may each independently be one among —NH$_2$, —NHR$_a$, —H, —OH, a C1 to C10 linear or branched alkyl group, a C3 to C10 linear or branched alkenyl group, and an aromatic group selected from Formula 3 below. The R$_a$ may be a C1 to C4 alkyl group.

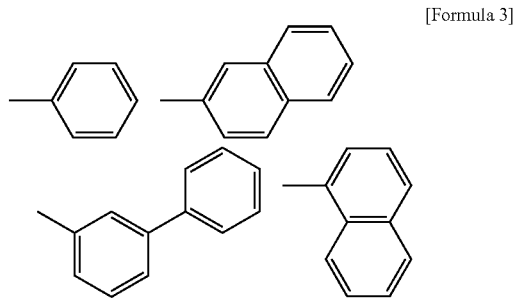

[Formula 3]

-continued

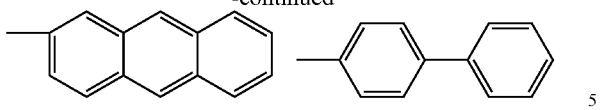

In Formula 2 above, R5 is composed of one of —SO$_3$Na, and —SO$_3$H. R6 is composed of one among —NH$_2$, —NHCH$_3$, and —NHC$_6$H$_5$.

The red dye may have a structure represented by Formula 4 and/or Formula 5 below.

[Formula 4]

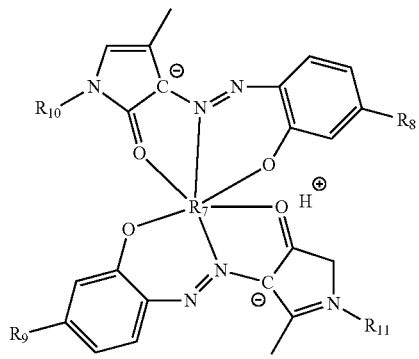

[Formula 5]

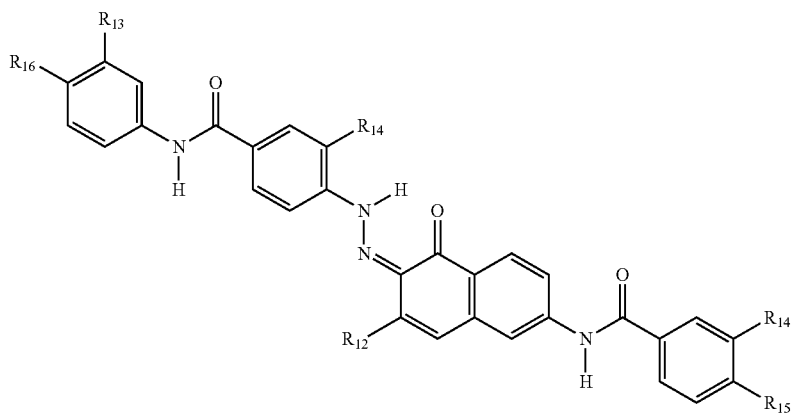

At this time, the R7 may be composed of any one selected from Cr, Mo, W, Mn, V, Nb, and Ta. The R8, the R9, the R10, and the R11 may be the same as or different from each other. The R8, the R9, the R10, and the R11 may be composed of one among —NO$_2$, —NH$_3$, —NHCH$_3$, —NC$_4$H$_{10}$, —NC$_2$H$_6$, —N(alkyl chain of C$_3$ or higher), and one or more aromatic groups. The R12 may be composed of any one selected from —SO$_3$Na, and —SO$_3$H. The R13 may be composed of any one selected from —COOH, and —COONa. The R14 and the R15 may be the same as or different from each other. The R14 and the R15 may be composed of any one selected from —H, —CH$_3$, —C$_2$H$_5$, or a linear alkyl group of C$_3$ or higher, a branched alkyl group of C$_3$ or higher, a linear alkene of C$_3$ or higher, a branched alkene of C$_3$ or higher, —NC$_4$H$_{10}$, —NC$_2$H$_6$, —NHCH$_3$, —NH$_2$, —N(alkyl chain of C$_3$ or higher), and one or more aromatic groups. The R16 is composed of one among —H, —OH, —SO$_3$H, and —COOH.

The green dye may have a structure represented by Formula 6 below.

[Formula 6]

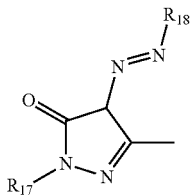

The R17 and the R18 may be the same as or different from each other. The R17 and the R18 may include any one or more selected from Formula 7 below.

[Formula 7]

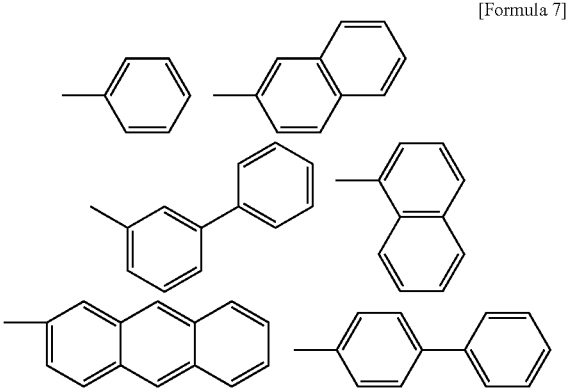

Figure 4:
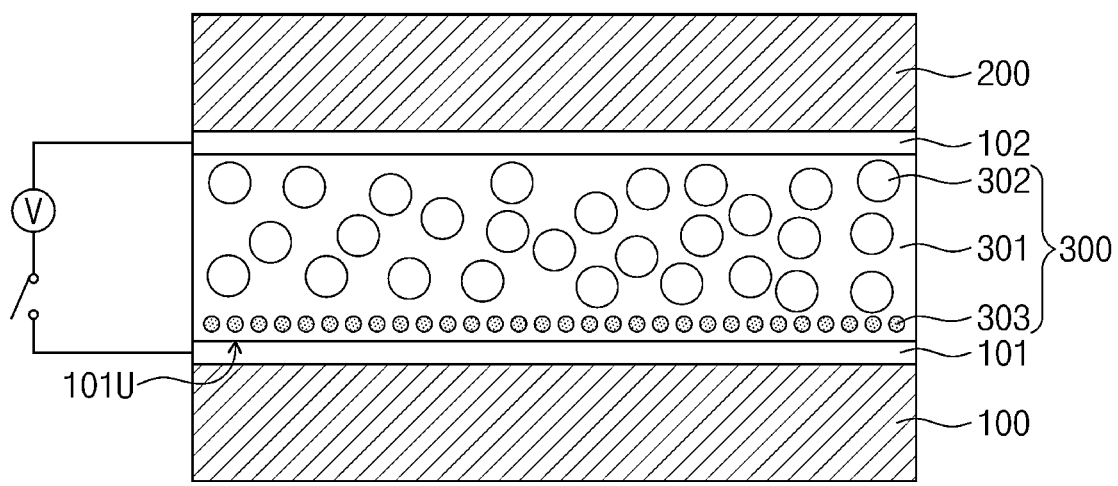
FIG. 4 is a view showing a polymer dispersed liquid crystal display according to some embodiments of the inventive concept, and is a view showing a state in which nano-particles are aligned along an upper surface of a first electrode.
Figure 5:
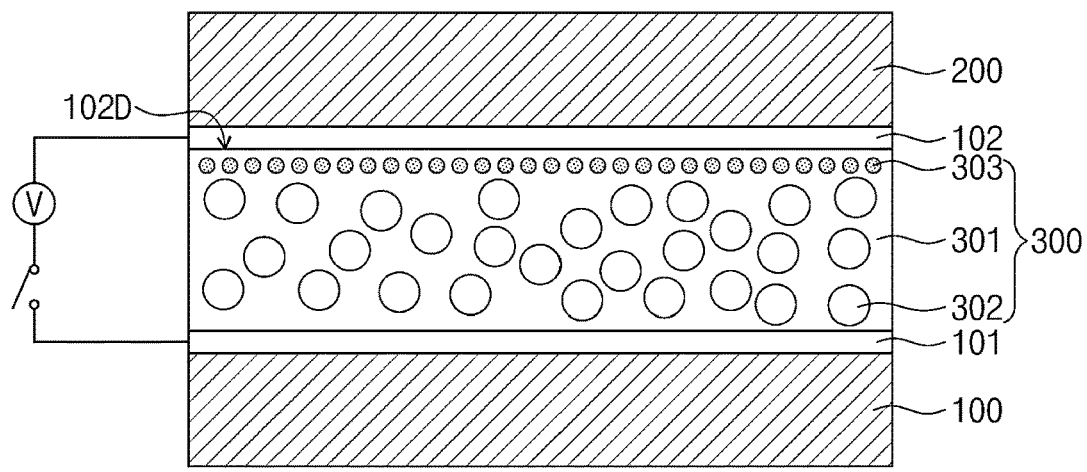
FIG. 5 is a view showing a polymer dispersed liquid crystal display according to some embodiments of the inventive concept, and is a view showing a state in which nano-particles are aligned along a lower surface of a second electrode.

FIG. 4 is a view showing a polymer dispersed liquid crystal display according to some embodiments of the inventive concept. FIG. 5 is a view showing a polymer dispersed liquid crystal display according to some embodiments of the inventive concept. In order to simply the description, the same descriptions as those of the polymer dispersed display described with reference to FIG. 1 to FIG. 2 will be omitted.

Referring to FIG. 4, nano-particles 303 may be aligned along an upper surface 101U of the first electrode. The nano-particles 303 may be aligned along the upper surface 101U of the first electrode 101 and then coated and fixed. After the nano-particles 303 are coated, the liquid crystal drops 302 and the polymer 301 may be formed.

Referring to FIG. 5, the nano-particles 303 may be aligned along a lower surface 102D of the second electrode 102. The nano-particles 303 may be aligned along the lower surface 102D of the second electrode 102. The nano-particles 303 may be aligned along the lower surface 102D of the second electrode 102 and then coated and fixed. After the nano-particles 303 are coated, the liquid crystal drops 302 and the polymer 301 may be formed to form the liquid crystal layer 300.

Since the nano-particles 303, which have light transmittance and are insulators, are distributed on the first electrode 101 or the second electrode 102, incident light may be diffused in various directions after passing through the liquid crystal layer 300. As a result, in a transparent state, the polymer dispersed liquid crystal display may provide constant transparency regardless of the position of a user.

Figure 6:
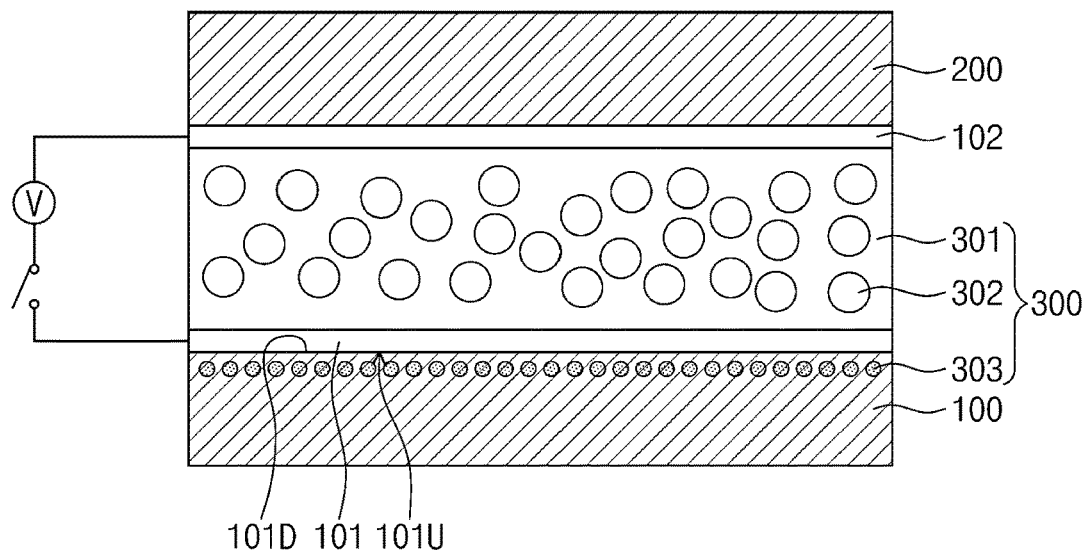
FIG. 6 is a view showing a polymer dispersed liquid crystal display according to some embodiments of the inventive concept, and is a view showing a state in which nano-particles are distributed in a first substrate.

FIG. 6 is a view showing a polymer dispersed liquid crystal display according to some embodiments of the inventive concept. In order to simply the description, the same descriptions as those of the polymer dispersed display described with reference to FIG. 1 to FIG. 2 will be omitted.

Referring to FIG. 6, nano-particles 303 may be distributed in the first substrate 100, and the nano-particles 303 may be aligned along an upper surface 100U of the first substrate 100. The nano-particles 303 may face a lower surface 101D of the first electrode 101. After the nano-particles 303 are distributed on the first substrate 100, the first electrode 101 may be formed, and thereafter, a liquid crystal layer 300 may be formed. Since the nano-particles 303 having insulation are distributed in the first substrate 100 rather than the first electrode 101, it is possible to prevent the driving voltage of the polymer dispersed liquid crystal display from increasing.

In addition, since the nano-particles 303, which have light transmittance and are insulators, are distributed in the first substrate 100, incident light may be diffused in various directions after passing through the liquid crystal layer 300. As a result, in a transparent state, the polymer dispersed liquid crystal display may provide constant transparency regardless of the position of a user.

According to a concept of the present invention, nano-particles may be distributed in a liquid crystal layer, and the nano-particles may include silicon oxide. The nano-particles have excellent transparency as a light diffuser for incident light, and have a refractive index similar to that of a liquid crystal and a polymer. Therefore, the incident light is diffused in many directions by the nano-particles. As a result, in a transparent state, a display may provide the same transparency regardless of the position and gaze direction of a user.

According to another concept of the present invention, nano-particles may be distributed in a substrate. The nano-particles, which are insulators, are distributed in the substrate, not on a first electrode or second electrode, and thus, may prevent the driving voltage of a polymer dispersed liquid crystal display from increasing.

According to yet another concept of the present invention, dyes may be distributed in a liquid crystal layer. As the dyes are distributed in the liquid crystal layer, a polymer dispersed liquid crystal display having various colors may be provided.

Although the embodiments of the present invention have been described with reference to the accompanying drawings, it will be understood by those who have ordinary skills in the art to which the present invention pertains that the present invention may be embodied in other specific forms without changing the technical spirit or essential features thereof. It is therefore to be understood that the above-described embodiments are illustrative in all aspects and not restrictive.

DESCRIPTION OF THE REFERENCE NUMERALS OR SYMBOLS

100: First substrate
101: First electrode
102: Second electrode
200: Second substrate
300: Liquid crystal layer
301: Polymer
302: Liquid crystal drops
303: Nano-particles
400: Power supply unit
304: Dyes

What is claimed is:

1. A polymer dispersed liquid crystal display comprising:
a first substrate and a second substrate disposed to oppose each other;
a first electrode on an upper surface of the first substrate;
a second electrode on a lower surface of the second substrate, wherein the upper surface of the first substrate faces the lower surface of the second substrate;
a liquid crystal layer disposed between the first electrode and the second electrode;
liquid crystal drops distributed in the liquid crystal layer; and
nano-particles distributed in the liquid crystal layer, wherein the nano-particles are insulators and have light transmittance,
wherein each of the nano-particles comprises:
a core portion composed of silicon oxide, and a shell portion surrounding the core portion.

2. The polymer dispersed liquid crystal display of claim 1, wherein the diameter of each of the nano-particles is smaller than the diameter of each of the liquid crystal drops.

3. The polymer dispersed liquid crystal display of claim 1, wherein the refractive index of the nano-particles is 1.35 to 1.65.

4. The polymer dispersed liquid crystal display of claim 2, wherein the diameter of each of the nano-particles is 30 nm to 350 nm.

5. The polymer dispersed liquid crystal display of claim 1, wherein the liquid crystal layer comprises a polymer which covers the liquid crystal drops and the nano-particles, wherein the weight ratio of the liquid crystal drops to the polymer is 1:2 to 3:2.

6. The polymer dispersed liquid crystal display of claim 1, wherein the nano-particles comprise silicon oxide.

7. The polymer dispersed liquid crystal display of claim 6, wherein the shell portion is an insulator and has light transmittance.

8. The polymer dispersed liquid crystal display of claim 7, wherein the thickness of the shell portion is 5 nm to 100 nm.

9. The polymer dispersed liquid crystal display of claim 7, wherein the shell portion comprises any one or more of —COOH, —Si, and —SiO—.

10. The polymer dispersed liquid crystal display of claim 1, wherein the liquid crystal layer comprises dyes, wherein:
- the dyes are dispersed in the liquid crystal layer; and
- each of the dyes is any one selected from a red dye, a blue dye, a green dye, and a dye formed of a mixture thereof.

11. A polymer dispersed liquid crystal display comprising:
- a first substrate and a second substrate disposed to oppose each other;
- a first electrode on an upper surface of the first substrate;
- a second electrode on a lower surface of the second substrate, wherein the upper surface of the first substrate faces the lower surface of the second substrate;
- a liquid crystal layer disposed between the first electrode and the second electrode;
- liquid crystal drops distributed in the liquid crystal layer; and
- nano-particles aligned along the upper surface of the first electrode, wherein the nano-particles are insulators and have light transmittance.

12. The polymer dispersed liquid crystal display of claim 11, wherein the nano-particles comprise silicon oxide.

13. The polymer dispersed liquid crystal display of claim 11, wherein each of the nano-particles comprises:
- a core portion comprising silicon oxide; and
- a shell portion surrounding the core portion, wherein the shell portion is an insulator and has light transmittance.

14. The polymer dispersed liquid crystal display of claim 13, wherein the volume ratio of the core portion to the shell portion in each of the nano-particles is 91:9 to 30:70.

15. The polymer dispersed liquid crystal display of claim 11, wherein the liquid crystal drops have a refractive index anisotropy of 0.05 to 0.30.

16. A polymer dispersed liquid crystal display comprising:
- a first substrate and a second substrate disposed to oppose each other;
- a first electrode on an upper surface of the first substrate;
- a second electrode on a lower surface of the second substrate, wherein the upper surface of the first substrate faces the lower surface of the second substrate;
- a liquid crystal layer disposed between the first electrode and the second electrode;
- liquid crystal drops distributed in the liquid crystal layer; and
- nano-particles distributed in the first substrate, wherein the nano-particles are aligned along the upper surface of the first substrate, and the nano-particles are insulators and have light transmittance.

17. The polymer dispersed liquid crystal display of claim 16, wherein the nano-particles face a lower surface of the first electrode, wherein the lower surface of the first electrode faces the upper surface of the first substrate.

18. The polymer dispersed liquid crystal display of claim 16, wherein the nano-particles comprise silicon oxide.

* * * * *